Figure 1:
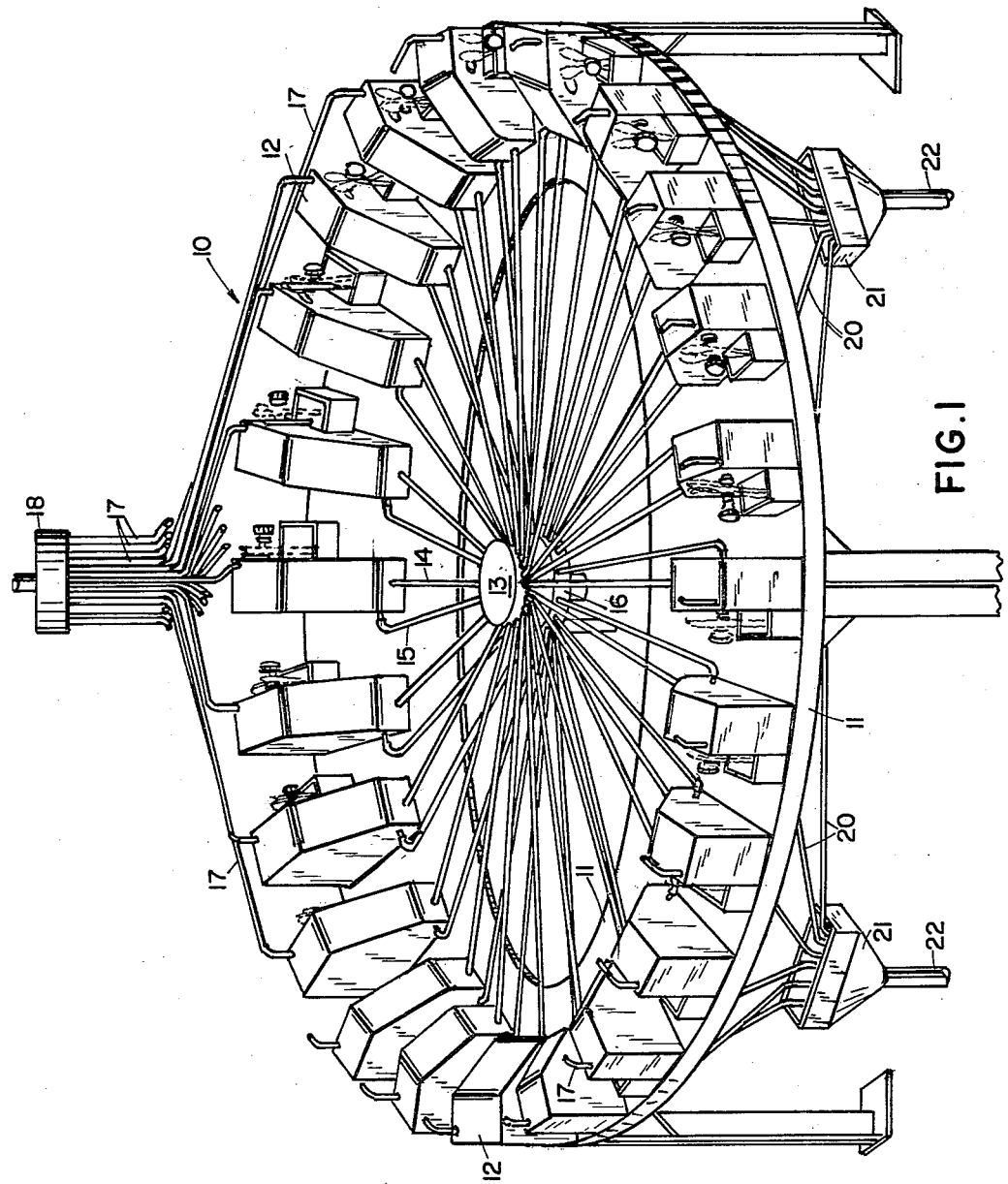

April 28, 1964

C. WEIDAUER 3,130,521

DEVICE FOR LAPPING THE CUTTING EDGES OF PINKING SHEARS

Filed Aug. 3, 1962

4 Sheets-Sheet 1

INVENTOR.
Curt Weidauer

BY Maxwell E. Sparrow

ATTORNEY.

INVENTOR.
Curt Weidauer

BY Maxwell E. Sparrow

ATTORNEY.

INVENTOR.
Curt Weidauer
BY Maxwell E. Sparrow
ATTORNEY.

April 28, 1964   C. WEIDAUER   3,130,521
DEVICE FOR LAPPING THE CUTTING EDGES OF PINKING SHEARS
Filed Aug. 3, 1962   4 Sheets-Sheet 4

INVENTOR.
Curt Weidauer
BY Maxwell E. Sparrow
ATTORNEY.

United States Patent Office 3,130,521
Patented Apr. 28, 1964

3,130,521
DEVICE FOR LAPPING THE CUTTING EDGES OF PINKING SHEARS
Curt Weidauer, Clinton Corners, N.Y., assignor to Samuel Briskman, New York, N.Y.
Filed Aug. 3, 1962, Ser. No. 214,686
3 Claims. (Cl. 51—26)

This invention relates to manufacturing shears having serrated or scalloped cutting edges, generally called pinking shears, and more particularly to a device for the lapping of the cutting edges of the blades of these shears.

It is of paramount importance for the functioning of pinking shears that all cutting edges and contours of the cutting blades mesh with one another with equal precision and under equal pressure. Shears in which this high degree of precision does not prevail do not cut, but rather rip or pinch the material to be cut. In manufacturing these shears, several steps have to be taken, for which several machines and devices have been invented and developed, such as being covered by my co-pending applications for a special drilling apparatus and for a blade milling machine. The lapping process for finalizing the machining of these blades requires a special device which is the object of this invention which consists in such novel features, construction arrangements, combinations of parts and improvements as may be shown and described in connection with the device herein disclosed by way of example only and as illustrative of a preferred embodiment. Objects and advantages of the invention will be set forth in part hereafter and in part will be obvious herefrom or may be learned by practicing the invention, the same being realized and attained by means of the instrumentalities and combinations pointed out in the appended claims.

It is the general object of this invention to provide new and useful contrivances for lapping the cutting edges of the blades of pinking shears having serrated or scalloped teeth.

Another object of the invention is to provide a device for lapping the blades of pinking shears, which is composed of operating units of equal design.

Furthermore, it is an object of the invention to provide a new device by which the production of said pinking shear blades is greatly improved.

Yet another object of the invention is to provide a device by which the manufacturing operation is performed within preset cycles in order to obtain a product of consistent uniform precision and quality independent of the attention and carefulness of the operator.

A further object of the invention is to provide a device for a simultaneous multiple operation by which the economy of the production of the pinking shears is greatly enhanced.

Figure 2:
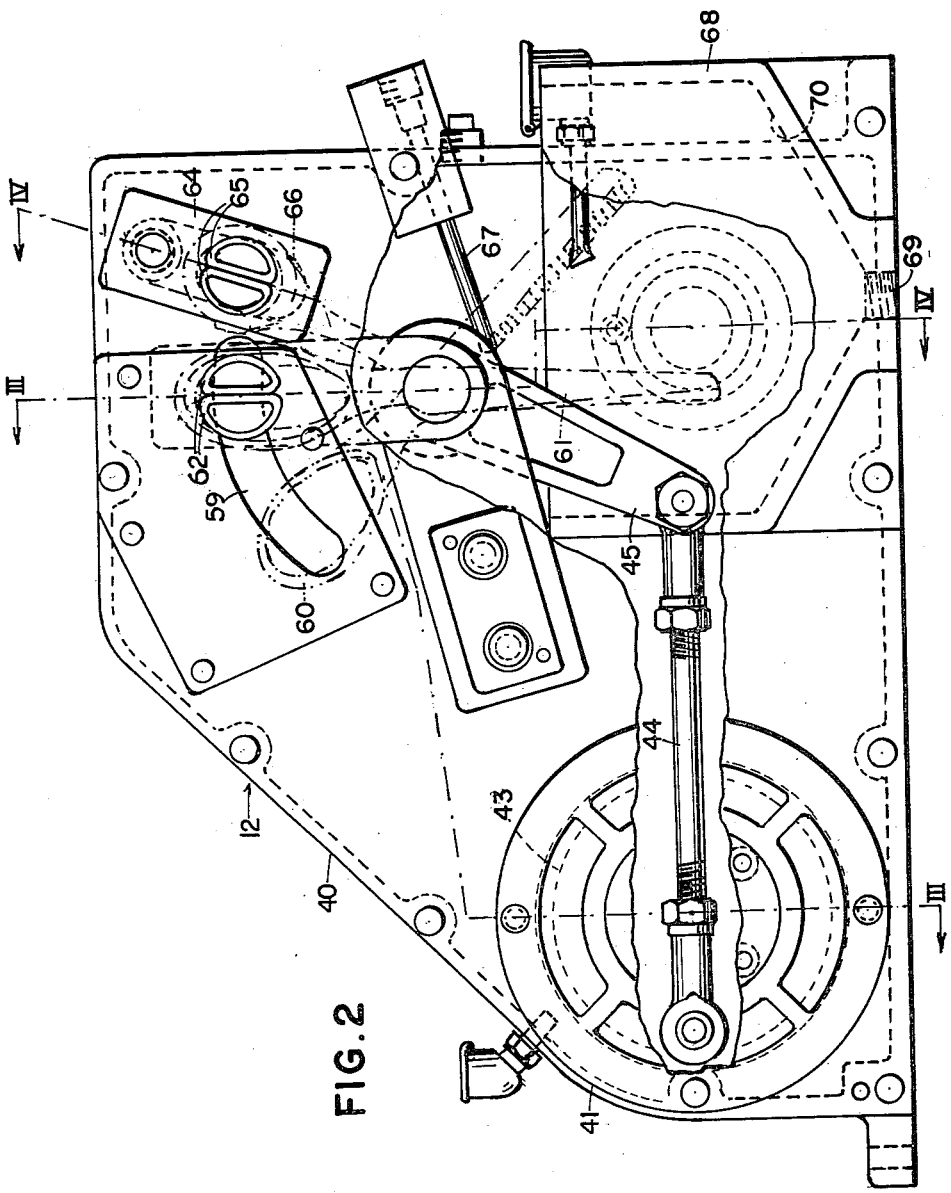
Figure 3:
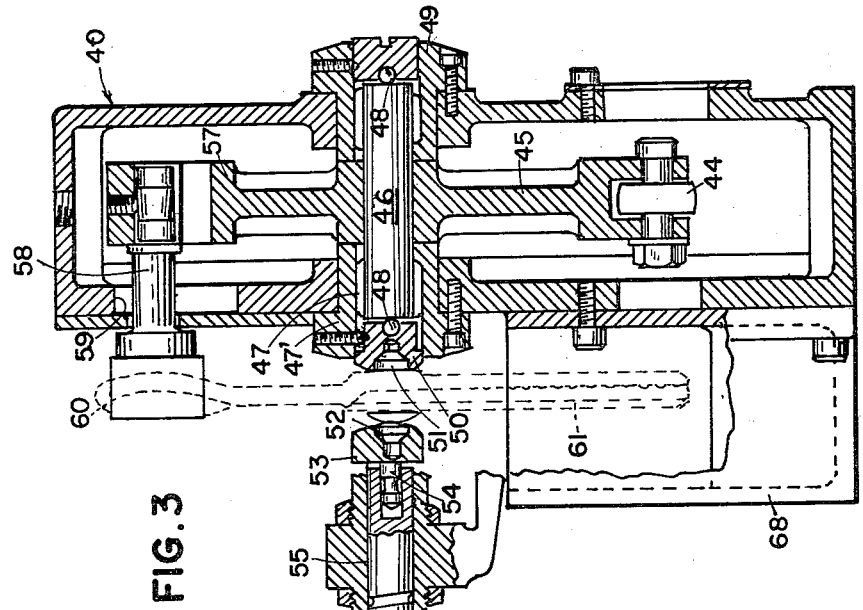
Figure 4:
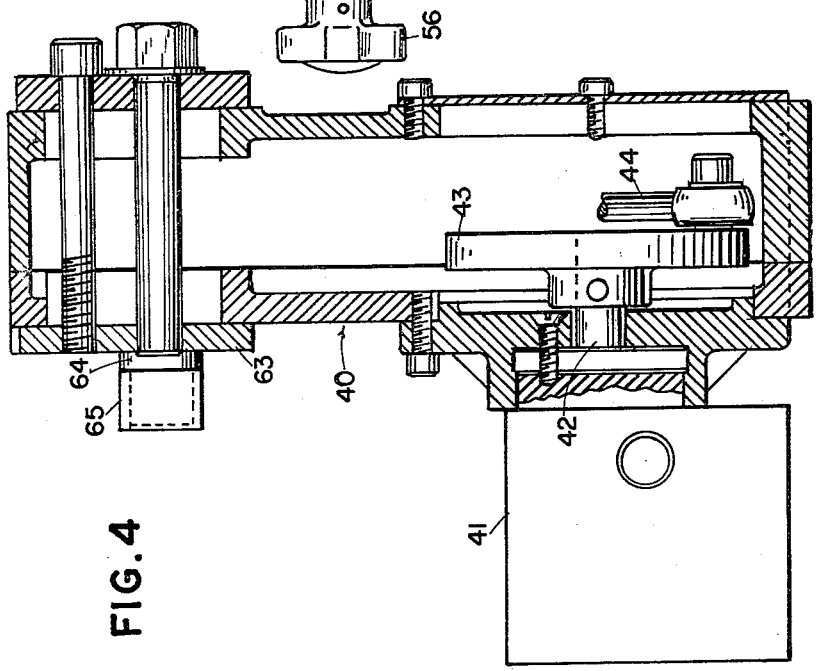
Figure 5:
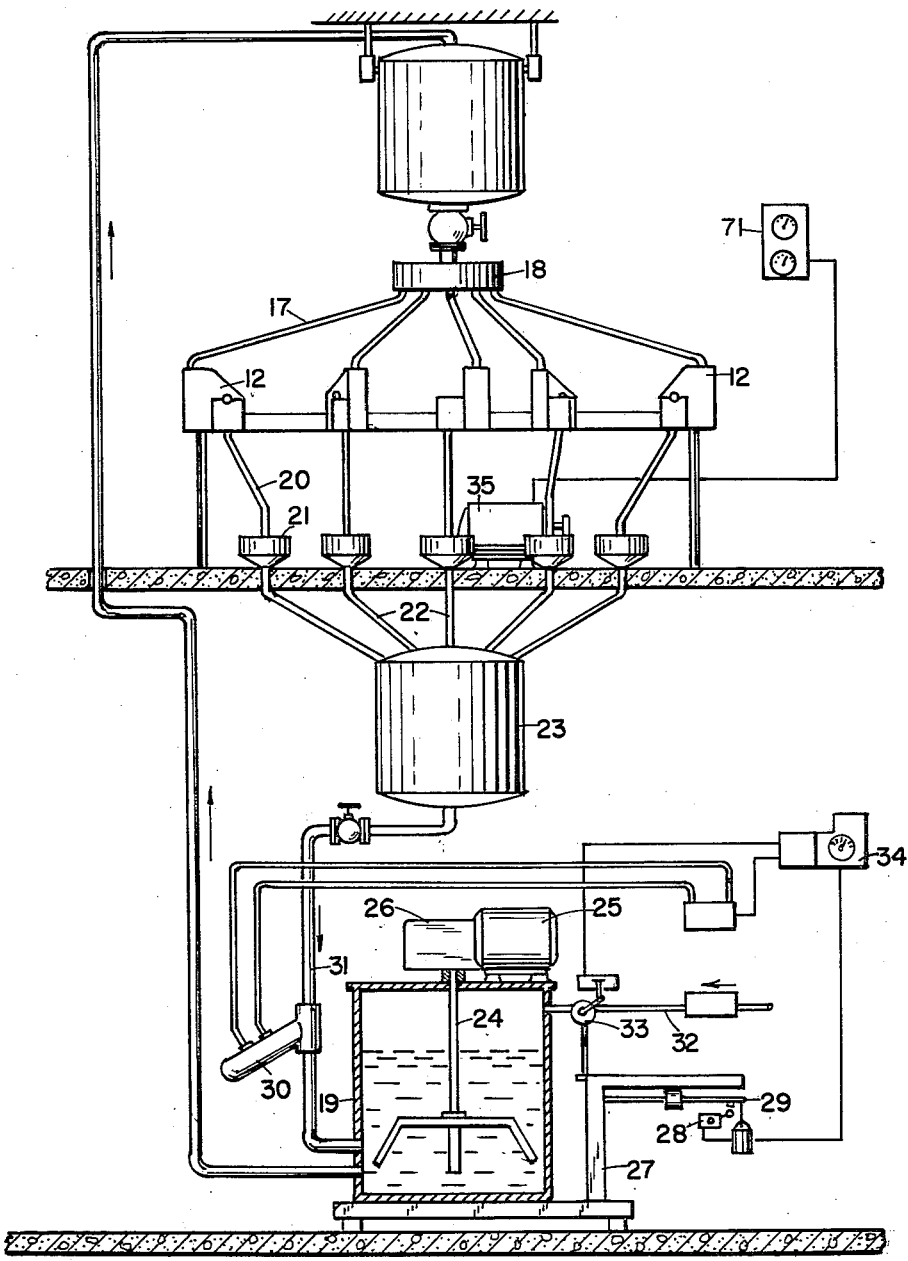

Various further and more specific purposes, features and advantages will clearly appear from the detailed description given below taken in connection with the accompanying drawings which form part of this specification and illustrate merely by way of example one embodiment of the device of the invention. In the following description and in the claims, parts will be identified by specific names for convenience, but such names are intended to be as generic in their application to similar parts as the art will permit. Like reference characters denote like parts in the several figures of the drawings in which:

FIG. 1 is a perspective view of the lapping device;
FIG. 2 is a side view, partly broken away, of one of the lapping units of the device;
FIG. 3 is a section of the unit shown in FIG. 2, taken along the line III—III of FIG. 2;
FIG. 4 is a section of the unit shown in FIG. 2, taken along the line IV—IV of FIG. 2; and
FIG. 5 is a schematic view of the apparatus for feeding the lapping compound to the lapping device.

Referring now in more detail to the drawings illustrating a preferred embodiment by which the invention may be realized, there is in FIG. 1 a lapping device 10 having a stationary, non-rotating, circular table 11 on which a plurality of lapping units 12 is mounted. Each one of these units 12 is independently hydraulically driven by a hydraulic pump 35 (shown schematically in FIG. 5). Hydraulic fluid is fed into a manifold 13 from which individual hose lines 14 carry the fluid to each unit 12. Likewise, return lines 15 are provided which feed back over a manifold 16 to the hydraulic pump. The necessary lapping compound is fed to each one of the units 12 by hose lines 17 leading from a manifold 18 into which the lapping compound is fed from a mixing container 19. The lapping compound flows from the manifold 18 by gravity to the units 12, from which it drains through hose lines 20 into receptacles 21 having strainers (not visible in the drawing). Pipe lines 22 lead the compound back into a receiver 23 from which it can flow back into the mixing container 19. A mixing device 24, driven by a motor 25 over a gearbox 26, is located in the container 19. The container 19 is placed on a scale 27. A microswitch 28 is arranged on the weight beam 29 of the scale, so that it may be operated when the content of the container 19 reaches a predetermined low level. A hydraulically operated valve 30 opens and closes the return line 31 of the compound, leading from the receiver 23 to the container 19. An air line 32 feeds compressed air into the container 19 when an electrically operated valve 33 is opened, controlled by a timer 34. The lapping compound thus is pneumatically fed from the container 19 into the manifold 18 above the lapping device. When the feed cycle is accomplished, the air valve 33 is closed and is set to a relief position so that no compressed air remains in the container 19. At the same time the hydraulically operated valve 30 is opened so that compound which had been gathered in the receiver 23, can flow freely into the container 19. The mixing device 24 runs continuously at slow speed, thus keeping the lapping compound, composed of a mineral oil and an abrasive, all times uniformly mixed. Thus, the lapping compound supply apparatus is fully automatic, controlled only by a timer, the cycle of which can be manually adjusted.

Each one of the lapping units 12 has a housing 40 in which a rotary hydraulic motor 41 is schematically indicated. The hydraulic motor 41 has a crankshaft 42 and a flywheel 43 thereon. A connecting rod 44 is journalled on the flywheel and oscillates a double-arm lever 45. The lever is located on a shaft 46 which rotates in antifriction bearings 47 which are arranged in retainers 47' in the housing 40. Steel balls 48, located in centering plugs 49, 50, serve as means for axially holding the shaft 46. The non-movable centering plug 50 has a receiving bore 51 into which a stud 52 precisely fits. Opposite this plug 50 and absolutely concentric with it is a retractable plug 53 having a hardened insert 54. Plug 53 is kept in a screw device 55 of the well-known quick-release type, having a handwheel 56 thereon. This device also serves for exerting the necessary pressure on the shear blades for the lapping operation.

On the free arm 57 of the double-arm lever 45 is a stud 58 which extends through a circular slot 59 of the housing 40 and has a shape which conforms to the handle of the blade 60 of the shear 61 (indicated in dotted lines). The stud has a protective and cushioning cover 62 made of rubber or the like. On the housing 40 is an adjustable plate 63 which has a stud 64 similar to the stud 58, which also has a rubber covering 65, over which the opening of the handle of the other blade 66 of the shears fits. A feeder 67 for the lapping compound is arranged in such manner as to let the compound flow over the blades during the lapping operation. A receptacle 68 catches the lapping compound. A drain opening 69 on the slanted bottom 70 of the receptacle 68 is connected to the lapping compound return line 20.

The operation proceeds as follows:

After the pinking shear blades have been drilled, counter-bored, reamed and milled on the drilling and milling devices, they are assembled to shears whereby a temporary pivotal stud is inserted in the bore of the blades. These shears 61 are put into the lapping units 12 whereby one handle is fitted over the stationary stud 64 whereas the other handle is fitted over the stud 58 of the free arm 57 of the double arm lever 45. When all units of the circular table 11 are loaded, the entire mechanism is started, that is, the hydraulic pump 35 starts running, setting all units 12 in motion, compressed air feeds lapping compound into the oscillating shear blades through feeders 67 until a certain predetermined preset time is elapsed. Timing devices 71 and 34 for the hydraulic pump 35 and for the operation of the lapping compound feeding apparatus 19, respectively, are arranged for shutting of the corresponding mechanisms. It has been found that the most efficient lapping operation giving the desired best results depends upon the duration of this operation, which, of course, varies corresponding to the material used for the shears. Cast iron shears require less lapping time than forged steel shears. After the timers have shut off the operations, the operator takes the finished shears off by backing the plug 53 off by means of the handwheel 56 and fits a fresh pair of blades 60 and 66, forming now a shear 61, into the unit 12 which just has been emptied. Tightening the plug 53 by turning the handwheel 56 readies the unit 12 again for operation. After the operator has toured around the circular table 11 and has taken all finished shears off and puts fresh ones into all units, he sets a new cycle of operation in motion by simply pushing a start button. Since the blades have been premachined to the same dimensions under very close tolerances, the final result is an operable, high-precision pinking shear, whereby this result is independent from the skill, attention or carefulness of the operator, who merely has to feed the parts into the device and starts every new cycle. The device, once set, takes care automatically of the precise function.

While the invention has been described and illustrated with respect to a certain preferred example which gives satisfactory results, it will be understood by those skilled in the art after understanding the principle of the invention, that various other changes and modifications may be made without departing from the spirit and scope of the invention and it is intended therefore in the appended claims to cover all such changes and modifications.

I claim:

1. A device for lapping the cutting edges of pinking shears, comprising in combination a non-rotatable table, a plurality of individual lapping units spaced apart from one another on the periphery of said table, a central hydraulic power supply means for operating said units, feeding and returning lines connecting said power supply means with said units, timed means for feeding lapping compound to said units comprising feeding and return lines connecting said means with said units, and timing means for shutting off the operation of said device after a preset, predetermined time period.

2. A device for lapping the cutting edges of pinking shears, according to claim 1, and each one of said individual units comprising a housing, a hydraulic motor in said housing, a crank-operated double-arm lever, said lever having a protruding stud on one arm thereof, a stationary stud on said housing, said stationary and said protruding stud on said arm of said lever being arranged for receiving the handles of the blades of a pinking shear, and centering means for locating said shear in said unit, and simultaneously holding said shear under pressure in said unit, said centering means consisting of a non-movable plug and a retractable plug opposite said non-movable plug.

3. A device for lapping the cutting edges of pinking shears according to claim 1, and said timed means for feeding lapping compound to said units comprising a mixing container for said lapping compound, means for admitting compressed air to said container for feeding said compound to said units, a timer for controlling said means and a weight control means for said mixing container for preventing compressed air from getting into said units instead of lapping compound.

No references cited.